United States Patent Office 2,840,764
Patented June 24, 1958

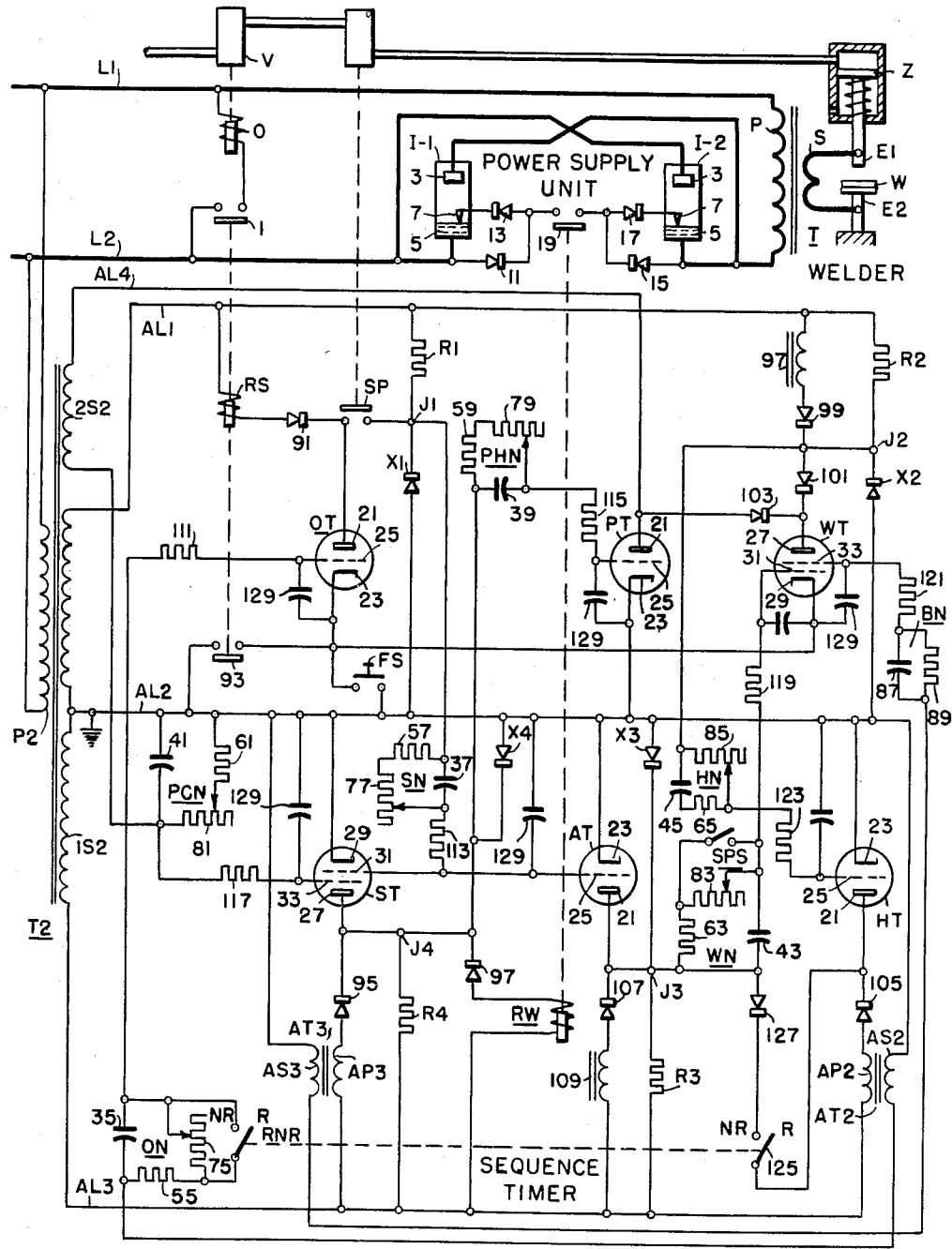

2,840,764

ELECTRONIC PULSATION SEQUENCE TIMER

Edward C. Hartwig, Walnut Creek, Calif., and Hubert W. Van Ness, East Aurora, N. Y., assignors to Westinghouse Electric Corporation, East Pittsburgh, Pa., a corporation of Pennsylvania Application September 4, 1953, Serial No. 378,446

14 Claims. (Cl. 315—252)

Our invention relates to electric discharge apparatus and has particular relation to sequence timers, particularly for timing an industrial process. Electric resistance welding is an example of such a process. This application relates to application Serial No. 378,546, filed September 4, 1953, to Edward C. Hartwig (hereinafter called Hartwig application) which is assigned to Westinghouse Electric Corporation In the Hartwig application a Sequence Timer of simple and low-cost structure having a low maintenance cost is disclosed. This timer is conceived for timing a welding operation in which the weld is produced with only a single current impulse. There are occasions, particularly in the welding of thick metals, in which each weld requires a plurality of impulses impressed at predetermined time intervals. Welding of this type is called interrupted-spot welding or pulsation welding and it may be carried out either with single-phase commercial frequency welders or with single or polyphase low-frequency welders. In pulsation welding the intervals during which the welding current flows are called the heat times or heat intervals and the intervening intervals during which no current flows are called the cool times or cool intervals. In interrupted spot welding of the commercial frequency type each current impulse delivered during a heat time consists of a number of successive commercial frequency half cycles and the cool times each persist for a selected number of commercial frequency half periods. In welding of the single-phase or polyphase low-frequency type each heat time current impulse consists of a low-frequency half cycle and the cool times each are measured in terms of the supply frequency periods. Succeeding heat time impulses may be of the same or of opposite polarities in low frequency welding.

Sequence timers for pulsation welding, in accordance with the teachings of the prior art, of which we are aware, have been markedly complex. A typical prior art sequence timer for pulsation welding with which we have had considerable experience includes thirteen electric discharge devices and associated circuit components. Needless to say, such a timer is costly and requires considerable servicing.

It is accordingly an object of our invention to provide a simple low-cost sequence timer for an industrial process such as pulsation welding which shall require a minimum of servicing.

Another object of our invention is to provide a sequence timer of the type disclosed in the Hartwig application particularly suitable for pulsation welding.

A further object of our invention is to provide novel electronic circuits which, while they have other uses, are particularly adapted for use in a sequence timer for a pulsation welder.

A still further object of our invention is to provide novel electronic circuits involving electric discharge devices having a plurality of control electrodes.

In accordance with our invention we provide a sequence timer of the general type disclosed in the Hartwig application which includes only one additional discharge device and associated components. This additional discharge device may be called the pulsation device. Its electrodes are connected to the squeeze discharge device in such manner that during the weld time the squeeze device is repeatedly rendered conducting and non-conducting during time intervals which are alternately the heat times and the cool times. Preferably the squeeze-time discharge device is conducting during the heat times and non-conducting during the cool times.

In accordance with a preferred practice of our invention the squeeze-time discharge device is provided with a pair of control electrodes. One of these control electrodes is connected to initiate the conduction of the discharge device at the beginning of the weld interval. The other is connected to the pulse-time discharge device so that the squeeze discharge device is rendered non-conducting and conducting during the welding time to time the heat and cool times.

In addition, in accordance with a further aspect of our invention, the weld discharge device is provided with a pair of control electrodes. One of the control electrodes is connected so that a potential is impressed on it to condition the weld discharge device to become conducting at the end of the weld time. The other control electrode is connected to the squeeze time device in such manner that the weld time device cannot become conducting to terminate the weld time during a heat time. Thus, the welding operation cannot be interrupted while a heat time is in process.

The novel features that we consider characteristic of our invention are set forth generally above. The invention itself, both as to its organization and method of operation, together with additional objects and advantages thereof, will be understood from the following description of a specific embodiment when read in connection with the accompanying drawing in which the single figure is a circuit diagram of a preferred embodiment of our invention.

*Description*

The apparatus shown in the drawing includes a Welder, a Power Supply Unit and a Sequence Timer. This apparatus is supplied from main buses or conductors L1 and L2 which may derive their power from the buses of a commercial frequency supply. The Sequence Timer is energized from auxiliary buses or conductors AL1, AL2, AL3 and AL4 which are supplied from a transformer T2. The conductors AL1, AL2 and AL3 are supplied from a secondary 1S2 of the transformer T2 which has an intermediate tap. The conductor AL4 is supplied from a separate secondary 2S2. Conductors AL1 and AL3 are connected to the end terminals of secondary 1S2 while conductor AL2 is connected to its intermediate terminals. The potentials on conductors AL1 and AL3 are then opposite in polarity with respect to the conductor AL2; that is, conductor AL2 is in effect a neutral. The potential of conductor AL4 is preferably in phase with the potential of conductor AL1.

The Welder includes a welding transformer T having a primarly P and a secondary S. A pair of welding electroes E1 and E2 are connected across the secondary. The work W is disposed on electrode E2 and the electrode E1 is movable in and out of engagement with the work by operation of a piston Z which is fluid actuated. The fluid for actuating the piston is supplied from a line controlled by a valve V which is opened when a solenoid O is energized. The solenoid O is adapted to be connected across the conductors AL1 and AL2 by the closing of a normally-open contact 1 of a starting relay RS and when so connected the valve V is opened. The welder also includes a pressure switch SP which closes when adequate pressure is built up between the electrodes E1 and E2 and the work W.

The Power Supply Unit includes a pair of ignitrons I-1 and I-2. Each ignitron has an anode 3, a cathode 5 and an ignitor 7. The ignitrons I-1 and I-2 are connected in a Weld-O-Trol contactor circuit. The anodes 3 and the cathode 5 of the ignitrons are connected in antiparallel between the conductors L1 and L2 in series with the primary P. A pair of rectifiers 11 and 13 and 15 and 17, respectively, are connected between the ignitor 7 and the cathode 5 of each of the ignitrons I-1 and I-2 in such a sense as to conduct positive current from the cathode to the ignitor. By positive current, we mean current consisting of positive charges (or holes) as distinct from electrons which may be regarded as flowing in the opposite direction. The ignitrons I-1 and I-2 may be rendered conducting by closing a contact 19 of the weld relay RW, which contact 19 connects the junctions of the rectifier pairs 11, 13 and 15, 17, respectively.

The Sequence Timer includes an off thyratron OT, a squeeze thyratron ST, a pulse thyratron PT, a weld thyratron WT, a hold thyratron HT and an auxiliary thyratron AT. The off thyratron OT, the hold thyratron HT, the pulse thyratron PT and the auxiliary thyratron AT each have an anode 21, a cathode 23 and a control electrode 25. The squeeze thyratron ST and the weld thyratron WT each have an anode 27, a cathode 29, a first control electrode 31 and a second control electrode 33. In saying that the first-mentioned thyratrons have one control electrode, we mean that the thyratrons each have one electrode (25) in addition to the anode and cathode on which control potential may be impressed. The thyratrons used in the usual practice of our invention may be, and usually are, of the multi-grid type (such as the WL2050) but in the case of the thyratrons OT, HT, PT and AT one the grids is directly connected to the cathode.

The Sequence Timer also includes a plurality of time-constant networks, an off network ON, a squeeze network SN, a heat time network PHN, a cool time network PCN, a weld network WN, a hold network HN, and a blocking network BN. Each of the above networks, ON, SN, PHN, PCN, WN, HN, except the blocking network BN, includes a capacitor 35, 37, 39, 41, 43, 45 respectively, shunted by a fixed resistor 55, 57, 59, 61, 63, 65 respectively, and a variable resistor 75, 77, 79, 81, 83, 85 respectively. The resistors 55 through 65 and 75 through 85 in each network determine the time during which the capacitors 35 through 45 when once charged may be discharged and the variable resistors may be set to correspond to the time interval in which it is desired that the network time out. The blocking network BN includes a capacitor 87 and a resistor 89 which is shown as fixed but may be variable. Preferably, the resistor is of such magnitude that the blocking network capacitor 87 is capable of being discharged in a short time interval of the order of a half period of the supply.

For the situation in which the apparatus is to operate as a spot welder and not a pulsation welder the switch SPS which shunts the resistor 83 in the network WN is provided. With this switch closed the Sequence Timer is capable of timing only one welding pulse as network WN times out in an interval of the order of one period of the supply.

The anode 21 of the off thyratron OT is connected to the conductor AL1 through the exciting coil of the starting relay RS and a rectifier 91 poled to conduct positive current from the conductor AL1 to the anode. The cathode 23 of the off thyratron OT is adapted to be connected to conductor AL2 through the normally open contact 93 of a starting relay RS or through a starting switch FS which may be, and usually is, a foot switch. Between the conductors AL1 and AL2 a resistor R1 and a rectifier X1 are connected. The rectifier is poled to conduct positive current in a direction opposite to that conducted by the thyratron OT. The purpose of the resistor R1 and rectifier X1 is explained in the Hartwig application. The anode of the thyratron OT is adapted to be connected to the junction J1 of the resistor R1 and the rectifier X1 through normally open pressure switch SP which is closed when adequate pressure is built up between the electrode E1 and work W.

The anode 27 of the squeeze thyratron ST is connected to the conductor AL3 through a plurality of branch networks. One of these networks includes the primary AP3 of an auxiliary transformer AT3 and a rectifier 95 poled to conduct positive current from the conductor AL3 to the anode; another branch includes a resistor R4 which is connected to the anode 27 at junction J4 and the third branch includes the exciting coil of the weld relay RW and a rectifier 97 poled to conduct positive current from the conductor AL3 to the anode 27. The cathode 29 of the squeeze thyratron ST is connected to the conductor AL2. A rectifier X4 is connected between the conductor AL2 and the junction J4. This rectifier X4 is poled to conduct positive current from the conductor AL2 to the junction J4.

The anode 21 of the pulse thyratron PT is connected to the conductor AL4. The cathode 23 is directly connected to the conductor AL2.

The anode 27 of the weld thyratron WT is connected to the conductor AL1 through an inductive reactance means 97 and a pair of rectifiers 99 and 101 both to conduct positive current in the direction from the conductor AL1 to the anode. The anode 27 of the weld thyratron WT is also connected to conductor AL4 and thus to the anode 21 of the pulse thyratron PT through a rectifier 103 poled to conduct positive current in the direction from conductor AL4 to the anode 27 of the weld thyratron WT. The cathode 29 of the weld thyratron WT is adapted to be connected to the conductor AL2 either through the normally open contact 93 of relay RS or through the starting switch FS. A resistor R2 and a rectifier X2 are connected in series between the conductors AL1 and AL2. This rectifier X2 is poled to conduct positive current from the conductor AL2 to the conductor AL1. The junction J2 of the resistor R2 and the rectifier X2 is connected to the junction of the rectifiers 99 and 101 connected in series between the conductor AL1 and the anode 27 of the weld thyratron WT.

The anode 21 of the hold thyratron HT is connected to the conductor AL3 through the primary AP2 of transformer AT2 and through a rectifier 105 poled to conduct positive current in the direction from the conductor AL3 to the anode. The cathode 23 of the hold thyratron HT is directly connected to the conductor AL2. The anode 21 of the auxiliary thyratron AT is connected to the conductor AL3 through inductive reactance means 109 and a rectifier 107 poled to conduct positive current from the conductor AL3 to the anode. The cathode 23 of the auxiliary thyratron AT is connected directly to the conductor AL2. A resistor R3 and a rectifier X3 are connected in series between the conductors AL3 and AL2. The rectifier X3 is poled to conduct positive current from the conductor AL2 to the conductor AL3. The anode of thyratron AT is connected to the junction J3 of the resistor R3 and the rectifier X3.

The off network ON is connected to the control electrode 25 of the off thyratron OT through a grid resistor 111 at one of its terminals and at the other it is connected to the conductor AL2 through the secondary AS2 of the transformer AT2. The squeeze network SN is connected through a grid resistor 113 between the junction J1 and the first control electrode 31 of the squeeze thyratron ST and the control electrode 25 of the thyratron AT. The heat-time network PHN is connected between the junction J4 and the control electrode 25 of the pulse thyratron PT through a grid resistor 115. The cool-time network PCN is connected through a grid resistor 117 between the conductor AL2 and the second control electrode 33 of the squeeze thyratron ST. This network is also connected to the secondary 2S2 and is thus supplied from the pulse thyratron. The weld network WN is connected between the junction J3 and the first control electrode 31 of the weld thyratron WT through a grid resistor 119. The blocking network BN is connected at one terminal to the second control electrode 33 of the thyratron WT through a grid resistor 121; at the other terminal the blocking network BN is connected to the conductor AL2 through the secondary AS3 to the transformer AT3. The hold network HN is connected between the junction J2 and the control electrode 25 of the hold thyratron HT through a grid resistor 123.

The anode of the hold thyratron HT is adapted to be connected to the weld network WN through a contact 125 of the repeat-non-repeat switch RNR when the latter is in the non-repeat position and through a rectifier 127 poled to conduct current from the weld network WN to the anode of the hold thyratron HT.

Surge suppressing capacitors 129 are connected between the control electrodes and cathodes of the thyratrons.

As in the case of the apparatus disclosed in the Hartwig application, the anode circuits of the thyratrons include inductive reactance means. Such means may be in the form of a lumped inductance 97 and 109 as is included in the anode circuits of the thyratrons WT and AT or they may be the loads of the thyratrons as, for example, the coil of the relay RS, the coil of the relay RW, the secondary 2S2 and the primaries AP2 and AP3. In each case, in the event that the inductive reactance is not adequate, additional lumped inductive reactance may be added.

*Stand-by*

In the stand-by condition of the apparatus the power switches or circuit breakers (not shown) for the apparatus is closed but the starting switch FS is open. Under the circumstances the cathodes of the thyratrons OT, ST, PT, WT, HT and AT are heated to the proper temperatures for operation and the thyratrons are ready to function.

Thyratron OT is in the non-conducting state because its anode circuit is open at the switch FS and at the lower contact 93 of the relay RS. The upper contact of relay RS is open and the solenoid O is de-energized so that the valve V is closed. The electrode E1 is retracted from the electrode E2 and the pressure switch PS is open.

During the half periods, during which the conductor AL1 is positive with respect to the conductor AL2, grid current flows between the first control electrode 31 and the cathode 29 of thyratron ST. A blocking potential is thus built up on the capacitor 37 of the squeeze network SN and thyratron ST is maintained non-conducting. In the same way during the intervals when conductor AL3 is positive with respect to conductor AL2 a blocking potential is built up on the capacitor 39 of the heat-time network PHN and thyratron PT is non-conducting. Thyratron AT is maintained non-conducting in the same manner as thyratron ST by the charge on the capacitor 37 of the squeeze network SN. The anode circuit of weld thyratron WT is open at the switch FS and at the lower contact 93 of relay RS. Thus, weld thyratron WT is in the non-conducting state. Since the anode-cathode circuit of thyratron WT is open at the cathode, network WN is uncharged. In the same manner the capacitor 45 of the hold network HN is charged so as to impress a blocking bias on the control electrode 25 of the hold thyratron HT. Since the squeeze thyratron ST is non-conducting, the transformer AT3 is de-energized and the capacitor 87 of the blocking network BN is uncharged. Since the thyratron HT is non-conducting the transformer AT2 is deenergized and the capacitor 35 of the off network ON is uncharged. Thus, the thyratron OT is in condition to conduct immediately on the closing of starting switch FS.

*Operation-repeat*

A welding process with the switch RNR in the repeat position will first be described.

To carry out a welding process with the apparatus the material W to be welded is disposed on the fixed electrode E2 and the starting switch FS is closed. The off thyratron OT is immediately rendered conducting and relay RS is actuated. At its lower now closed contact, relay RS locks in thyratron OT independently of the starting switch FS. At the upper contact, now closed, of relay RS the energizing circuit for the solenoid O is closed and the solenoid valve V is opened. The piston Z is now urged downward and the electrode E1 engages the work. When adequate pressure is built up on the electrode, the pressure switch SP closes. The squeeze network SN is now connected to the anode 21 of the thyratron OT which is conductive. As is the case in the apparatus disclosed in the Hartwig application, thyratron WT may initially fire for a half period when switch FS is closed but as explained there, this does not affect the operation.

The network WN is connected to conductor AL3 through junction J3 but as has been seen since the cathode circuit of thyratron WT is open at contact 93 and switch FS, capacitor 43 cannot be charged. Depending on the polarity of bus AL1 at the instant of closure of operating switch FS, thyratron WT may or may not be rendered conducting. If thyratron WT is rendered conducting, it will remain so for not more than one half period of its anode supply. During the succeeding half period of the supply when bus AL3 is positive relative to bus AL2, the capacitor 43 will be charged so as to impress a blocking potential between the control electrode and cathode of thyratron WT to prevent further conduction of thyratron WT. The minimum time constant of hold network HN as determined by resistor 65 and capacitor 45 is such that conduction of thyratron WT for the one half period of the supply is not sufficient to render thyratron HT conducting.

The thyratron OT when it conducts shunts out the first-grid-cathode circuit of thyratron ST and the capacitor 37 of network SN discharges. When the charge on this capacitor has discharged to a small magnitude, the squeeze thyratron ST and the auxiliary thyratron AT are rendered conducting. As is explained in the Hartwig application, the squeeze thyratron and the auxiliary thyratron become conducting at the beginning of a positive half period of the anode-cathode potential impressed between the conductors AL3 and AL2 because of the carry-over effect of the off thyratron OT.

The conduction of thyratron ST causes relay RW to be actuated and the contact 19 of this relay closes the firing circuits for ignitrons I-1 and I-2. Current now flows through the ignitrons and the primary P of the welding transformer during alternate half periods of the supply L1, L2 and welding current is induced through the secondary S.

The conduction of the squeeze thyratron ST interrupts the charging of the capacitor 39 of the heat time network PHN and the latter discharges. This network times out at the end of the heat time and at the beginning of the subsequent positive half period of the potential between buses AL4 and AL2 the thyratron PT is rendered conducting. The capacitor 41 of the cool time network PCN is now charged and a blocking potential is impressed on the second control electrode 33 of the thyratron ST, the latter becomes non-conducting and the cool time is thus started. When the thyratron ST becomes non-conducting, the relay RW is deenergized and the flow of the current through the primary P is interrupted when the last of the ignitrons I-1 or I-2 to conduct becomes non-conducting. When the thyratron ST becomes non-conducting, the capacitor 39 of the heat network PHN is again charged impressing a blocking potential on the thyratron PT. The latter now becomes non-conducting interrupting the charging of the capacitor 41 of the cool network PCN. The latter discharges during the cool time and when the network times out, the thyratron ST is rendered conducting again actuating relay RW and causing welding current to flow through the primary P during a second heat interval or heat time. During this latter heat time the network PHN again times out and eventually thyratron PT is again rendered conducting to repeat the above-described operations. Thyratrons ST and PT thus continue to conduct alternately to produce alternate heat and cool times and an impulse, or interrupted spot, weld is produced.

When the conduction of the squeeze thyratron ST is initiated on the timing out of the network SN the auxiliary thyratron AT is also rendered conducting. The charging of the capacitor 43 of the weld network WN is thus interrupted and this network times out. The thyratron AT continues to conduct while the thyratron ST is being rendered alternately conducting and non-conducting. Thus the network WN continues to time out during the succeeding heat and cool times. Eventually the network WN times out and a potential is impressed on the first control electrode 31 of thyratron WT which conditions this thyratron to become conducting.

The thyratron WT is not controlled by the first control electrode 31 alone. It is also controlled by the second control electrode 33 and the latter may have a bias impressed thereon by the blocking network BN if the capacitor 87 of this network is charged. This capacitor 87 is charged during the intervals during which the thyratron ST conducts. Accordingly, if during any interval thyratron ST has been conducting, a potential is impressed on the network BN to block thyratron WT. Since the conduction of thyratron ST hangs over into the half period during which the potential of conductor AL3 is negative relative to the potential of conductor AL2, this thyratron ST, if it conducts at the beginning of any of its positive half periods, is still conducting when the potential of conductor AL1 becomes positive relative to the potential of conductor AL2. Thus, a blocking potential is impressed on network BN during any positive half period of thyratron WT which follows a conducting positive half period of thyratron ST. This blocking potential leaks off in a time interval of the order of a half period of the potential impressed between conductors AL1 and AL2. Hence thyratron WT can only conduct during a half period following one during which thyratron ST has not conducted. In this manner the conduction of thyratron WT is prevented before a heat time has come to an end.

With the switch SPS closed the network WN times out in an interval of the order of one period and the thyratron WT can conduct at the end of the first heat time. Thus only one welding pulse is supplied where the switch SPS is closed.

Following the last heat time after the weld network WN times out the weld thyratron WT then becomes conducting. The conduction of the weld thyratron WT connects the anode of the thyratron PT to the conductor AL2 through the closed contact 93 of relay RS and thus prevents any further conduction of the latter. At the same time, conduction of thyratron WT maintains the blocking potential on capacitor 41 of network PCN to maintain thyratron ST non-conducting. The heat and cool time operation of the thyratrons ST and PT is thus positively prevented and the network PHN is reset for another weld.

When the weld thyratron WT becomes conducting the charging of the capacitor 45 in the hold network HN is also interrupted and the latter times out. At the end of the hold time the hold thyratron HT is rendered conducting, current is now supplied through the transformer AT2 to charge the off network ON and the off thyratron OT is rendered non-conducting. The relay RS is deenergized, deenergizing the solenoid O and causing the electrode E1 to be retracted from the work W. When thyratron OT becomes non-conducting the capacitor 37 in network SN is immediately charged rendering thyratron AT non-conducting. The capacitor in network WN is now charged rendering thyratron WT non-conducting. The capacitor in network HN is then charged rendering thyratron HT non-conducting. The apparatus is now reset and if the starting switch FS is still closed another weld may be produced with the sequence timer going through the operation described above. The second operation starts only after the off network ON times out.

*Operation.—Non-repeat*

A welding process with the repeat-non-repeat switch RNR set in the non-repeat position will now be described.

In this operation the sequence timer follows the same sequence as with the switch set for repeat until the point at which the thyratron HT is rendered conducting. Since in the non-repeat position of the switch RNR the junction J3 is connected to the anode of thyratron HT through the rectifier 127 and the contact 125, the charging of the capacitor 43 of the weld network WN is prevented by the conduction of the thyratron HT even after the thyratron AT becomes non-conducting. Thus, the thyratron WT remains conducting and the repetition of a welding operation is prevented unless the anode circuit of thyratron WT is opened at the starting switch FS. Once the starting switch FS is opened thyratron WT becomes non-conducting, network HN is recharged and thyratron HT becomes non-conducting to reset the apparatus.

*Conclusion*

The Sequence Timer disclosed herein is capable of timing an interrupted spot, or pulsation, weld but in spite of this fact is of relatively simple structure having only 6 tubes and associated components. This compares with the 13 tubes of the prior art apparatus.

While we have shown and described a certain specific embodiment of our invention, many modifications thereof are possible. Our invention, therefore, is not to be restricted except insofar as is necessitated by the spirit of the prior art.

We claim as our invention:

1. In combination a first electric discharge device of the gaseous type having an anode, a cathode and a control electrode; a second electric discharge device of the gaseous type having an anode, a cathode and a control electrode; a first conductor; a second conductor; a third conductor; said first, second and third conductors being electrically separate; means for impressing a first alternating potential between said first and said second conductors; inductive reactance means; means including said inductive reactance means for connecting said anode and cathode of said first device between said third conductor and said second conductor, respectively; means for connecting said anode and cathode of said second device between said first conductor and said second conductor respectively; a first time-constant network; a second time-constant network; means for connecting said first network in charging and blocking relationship in circuit with said anode and cathode of said second device and said control electrode and cathode of said first device; said first network being charged on the occurrence of a change in the conductivity of said second device and when so charged blocking said first device; means for connecting said second network in charging relationship between said anode of said first device and said control electrode of said second device so that said second network is charged by the positive current flowing from said anode of said first device to said control electrode of said second device while said first device is non-conducting and is permitted to discharge while said first device is conducting, said first device being maintained non-conducting when said first network is charged and said second device being manitained non-conducting when said second network is charged, said first network being uncharged and said second network being charged in the stand-by condition of said combination, means independent of said first network for maintaining said first device non-conducting in the stand-by condition of said combination, and means independent of said network for rendering said first device conducting to start the operation of said combination.

2. In combination a first electric discharge device of the gaseous type having an anode, a cathode and a control electrode; a second electric discharge device of the gaseous type having an anode, a cathode and a control electrode; a first conductor; a second conductor; a third conductor; said first, second and third conductors being electrically separate; means for impressing a first alternating potential between said first conductor and said second conductor; means for impressing a second alternating potential between said third conductor and said second conductor; inductive reactance means; means including said inductive reactance means for connecting said anode and cathode of said first device between said third conductor and said second conductor respectively; means for connecting said anode and cathode of said second device between said first conductor and said second conductor respectively; a first time-constant network; a second time-constant network; means for connecting said second network in charging relationship between said anode of said first device and said control electrode of said second device; said first network being charged by the positive current flowing between said anode of said first device and said control electrode of said second device when said first device is non-conducting and being permitted to discharge while said second device is conducting; means for connecting said first network in charging and blocking relationship in circuit with said anode and cathode of said second device and said control electrode and cathode of said first device; said first device conducting when said first network is discharged and thereby permitting said second network to time the non-conduction of said second device and the conduction of the first device and said second device conducting when said second network is discharged and thereby permitting said first network to time the non-conduction of said first device and the conduction of said second device; means operating independently of said second device for maintaining said first device non-conducting in the stand-by condition of said combination and for initiating the conduction of said first device to initiate operation of said combination; and means operating independently of said second device for terminating the conducting of said first device after the start of operation of said combination, said terminating means including means for preventing said terminating means for becoming effective as aforesaid until after said first device has conducted during the last of a series of alternate half periods of said second potential while said second network was in the process of timing out.

3. In combination a first electric discharge device having an anode, a cathode and a control electrode; a second electric discharge device having an anode, a cathode and a control electrode; a first conductor; a second conductor; a third conductor; said first, second and third conductors being electrically separate; means for impressing a first alternating potential between said first and said second conductors; means for impressing a second alternating potential between said third conductor and said second conductor; inductive reactance means; means including said inductive reactance means for connecting said anode and cathode of said first device between said third conductor and said second conductor, respectively; means for connecting said anode and cathode of said second device between said first conductor and said second conductor respectively; a first time-constant network; a second time-constant network; means for connecting said first network in charging relationship between said anode of said second device and said cathode of said first device; said first network being charged by the flow of positive current to said anode of said second device through said network; means connecting said first network between said control electrode and cathode of said first device so that said first network is charged blocking the conduction of said first device; means for connecting said second network in charging relationship between said anode of said first device and said control electrode of said second device; said second network being charged by the flow of positive current from said anode of said first device to said control electrode of said second device and when charged blocking the conduction of said second device; a third electric discharge device having an anode, a cathode and a control electrode; means for impressing third alternating potential in opposite phase to said second potential between said anode and cathode of said third device; a third time-constant network; means for connecting said third network in charging relationship between said anode of said first device and said control electrode of said third device so that said third network is charged by the flow of positive current through said third network to the control electrode of said third device while said first device is conducting, said third network while charged impressing a blocking potential on said third device; means independent of said first network for maintaining said first device non-conducting; means independent of said first network for rendering said first device conducting; and means responsive to said rendering means for conditioning said third device to become conducting a predetermined time interval after said first device becomes conducting.

4. In combination a first conductor; a second conductor; a third conductor; a fourth conductor; each of said conductors being electrically separate from the others, means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase, a first gaseous electric discharge device having an anode, a cathode and a control electrode; a second gaseous electric discharge device having an anode, a cathode and a control electrode; a third gaseous electric discharge device having an anode, a cathode and a control electrode; inductive reactance means; means including said inductive reactance means for connecting said anode and cathode of said first device between said third conductor and said second conductor respectively; means for connecting said anode and cathode of said second device between said first conductor and said second conductor respectively; means for connecting said anode and cathode of said third device between said fourth conductor and said second conductor respectively; a first time-constant network; a second time-constant network; a third time-constant network; means for connecting said first network in charging relationship between said control electrode of said second device and said anode of said first device so as to be charged by positive current flow between said anode of said first device and said control electrode of said second device while said first device is non-conducting, said first network blocking conduction of said second device when so charged; means for connecting said second network in charging relationship between said cathode of said first device and said anode of said second device, said second network being charged by flow of positive current through said second network to said anode of said second device; means connecting said second network between said control electrode and cathode of said first device so that when said second network is charged it blocks conduction of said first device, and means for connecting said third network in charging relationship between said control electrode of said third device and said anode of said first device, so that said third network is charged by the flow of positive current from said anode of said first device to said control electrode of said third device while said first device is conducting, said third network preventing conduction of said third device when so charged.

5. In combination a first conductor; a second conductor; a third conductor; a fourth conductor; each of said conductors being electrically separate from the others; means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase; a first gaseous electric discharge device having an anode, a cathode and a control electrode; a second gaseous electric discharge device having an anode, a cathode and a control electrode; a third gaseous electric discharge device having an anode, a cathode and a control electrode; a transformer having inductive reactance and having a primary and a secondary; means including said primary for connecting said anode and cathode of said first device between said third conductor and said second conductor respectively; means for connecting said anode and cathode of said second device between said first conductor and said second conductor respectively; means for connecting said anode and cathode of said third device between said fourth conductor and said second conductor respectively; a first time-constant network; a second time-constant network; a third time-constant network; means for connecting said first network in charging relationship between said control electrode of said second device and said anode of said first device so as to be charged by positive current flow between said anode of said first device and said control electrode of said second device while said first device is non-conducting, said first network blocking conduction of said second device when so charged; means for connecting said second network in charging relationship between said cathode of said first device and said anode of said second device, said second network being charged by flow of positive current through said second network to said anode of said second device; means connecting said second network between said control electrode and cathode of said first device so that when said second network is charged it blocks conduction of said first device; and means including said secondary for connecting said third network in charging relationship between said control electrode of said third device and said anode of said first device, so that said third network is charged by the flow of positive current from said anode of said first device to said control electrode of said third device while said first device is conducting, said third network preventing conduction of said third device when so charged.

6. In combination a first conductor; a second conductor; a third conductor; a fourth conductor; each of said conductors being electrically separate from the others, means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase; a first gaseous electric discharge device having an anode, a cathode, a first control electrode and a second control electrode; a second gaseous electric discharge device having an anode, a cathode and a control electrode; a third gaseous electric discharge device having an anode, a cathode and a control electrode; inductive reactance means; means including said inductive reactance means for connecting said anode and cathode of said first device between said third conductor and said second conductor respectively; means for connecting said anode and cathode of said second device between said first conductor and said second conductor respectively; means for connecting said anode and cathode of said third device between said fourth conductor and said second conductor respectively; a first time-constant network; a second time-constant network; a third time-constant network; means for connecting said first network in charging relationship between said control electrode of said second device and said anode of said first device so as to be charged by positive current flow between said anode of said first device and said control electrode of said second device while said first device is non-conducting, said first network blocking conduction of said second device when so charged; means for connecting said second network in charging relationship between said cathode of said first device and said anode of said second device, said second network being charged by flow of positive current through said second network to said anode of said second device; means connecting said second network between said second control electrode and cathode of said first device so that when said second network is charged it blocks conduction of said first device, means for connecting said third network in charging relationship between said control electrode of said third device and said anode of said first device, so that said third network is charged by the flow of positive current from said anode of said first device to said control electrode of said third device while said first device is conducting, said third network preventing conduction of said third device when so charged, means connected to said first control electrode for maintaining said first device non-conducting independently of said first network; and means to be connected to said first control electrode for rendering said first device conducting independently of said first network.

7. In combination a first conductor; a second conductor; a third conductor; a fourth conductor; each of said conductors being electrically separate from the others; means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase; a first gaseous electric discharge device having an anode, a cathode, a first control electrode and a second control electrode; a second gaseous electric discharge device having an anode, a cathode and a control electrode; a third gaseous electric discharge device having an anode, a cathode and a control electrode; a fourth gaseous electric discharge device having an anode and a cathode; first inductive reactance means; second inductive reactance means; means including said first inductive reactance means for connecting said anode and cathode of said first device between said third conductor and said second conductor respectively; means for connecting said anode and cathode of said second device between said first conductor and said second conductor respectively; means for connecting said anode and cathode of said third device between said fourth conductor and said second conductor respectively; a first time-constant network; a second time-constant network; a third time-constant network; a fourth time-constant network; means for connecting said first network in charging relationship between said control electrode of said second device and said anode of said first device so as to be charged by positive current flow between said anode of said first device and said control electrode of said second device while said first device is non-conducting, said first network blocking conduction of said second device when so charged; means for connecting said second network in charging relationship between said cathode of said first device and said anode of said second device, said second network being charged by flow of positive current through said second network to said anode of said second device; means connecting said second network between said second control electrode and cathode of said first device so that when said second network is charged it blocks conduction of said first device, means for connecting said third network in charging relationship between said control electrode of said third device and said anode of said first device, so that said third network is charged by the flow of positive current from said anode of said first device to said control electrode of said third device while said first device is conducting, said third network preventing conduction of said third device when so charged, means connecting said fourth network in charging relationship between said fourth conductor and said first control electrode to be charged by the flow of positive current from said fourth conductor to said first control electrode and when so charged blocking conduction of said first device even with said first network discharged; means including said second reactance means for connecting said anode and cathode of said fourth device between said fourth conductor and said second conductor respectively; and means for connecting said fourth network between said anode of said fourth device and said first control electrode whereby said fourth network may be charged by the conduction of said fourth device.

8. In combination a first conductor, a second conductor; a third conductor; a fourth conductor; each of said conductors being electrically separate from the others; means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase; a first gaseous electric discharge device having an anode, a cathode and a control electrode; a second gaseous electric discharge device having an anode, a cathode and a control electrode; a third gaseous electric discharge device having an anode, a cathode, a first control electrode, and a second control electrode; inductive reactance means; means including said inductive reactance means for connecting said anode and cathode of said first device between said third conductor and said second conductor respectively; means for connecting said anode and cathode of said second device between said first conductor and said second conductor respectively; means for connecting said anode and cathode of said third device between said fourth conductor and said second conductor respectively; a first time-constant network; a second time-constant network; a third time-constant network; means for connecting said first network in charging relationship between said control electrode of said second device and said anode of said first device so as to be charged by positive current flow between said anode of said first device and said control electrode of said second device while said first device is non-conducting, said first network blocking conduction of said second device when so charged; means for connecting said second network in charging relationship between said cathode of said first device and said anode of said second device, said second network being charged by flow of positive current through said second network to said anode of said second device; means connecting said second network between said control electrode and cathode of said first device so that when said second network is charged blocks conduction of said first device; means for connecting said third network in charging relationship between said second control electrode of said third device and said anode of said first device, so that said third network is charged by the flow of positive current from said anode of said first device to said control electrode of said third device while said first device is conducting, said third network preventing conduction of said third device when so charged, means connected to said first device for maintaining said first device non-conducting independently of said first network; means to be connected to said first device for rendering said first device conducting independently of said first network; and means connected to said first control electrode for conditioning said third device to become conducting when said third network is substantially discharged.

9. In combination a first conductor; a second conductor; a third conductor; a fourth conductor; each of said conductors being electrically separate from the others; means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors, said second and third potentials being of substantially opposite phase; a first gaseous electric discharge device having an anode, a cathode, a first control electrode and a second control electrode; a second gaseous electric discharge device having an anode, a cathode and a control electrode; a third gaseous electric discharge device having an anode, a cathode, a first control electrode, and a second control electrode; inductive reactance means; means including said inductive reactance means for connecting said anode and cathode of said first device between said third conductor and said second conductor respectively; means for connecting said anode and cathode of said second device between said first conductor and said second conductor respectively; means for connecting said anode and cathode of said third device between said fourth conductor and said second conductor respectively; a first time-constant network; a second time-constant network; a third time-constant network; means for connecting said first network in charging relationship between said control electrode of said second device and said anode of said first device so as to be charged by positive current flow between said anode of said first device and said control electrode of said second device while said first device is non-conducting; said first network blocking conduction of said second device when so charged; means for connecting said second network in charging relationship between said cathode of said first device and said anode of said second device, said second network being charged by flow of positive current through said second network to said anode of said second device; means connecting said second network between said second control electrode and cathode of said first device so that when said second network is charged it blocks conduction of said first device; means for connecting said third network in charging relationship between said second control electrode of said third device and said anode of said first device, so that said third network is charged by the flow of positive current from said anode of said first device to said second control electrode of said third device while said first device is conducting, said third network preventing conduction of said third device when so charged; means connected to said first control electrode of said first device for maintaining said first device non-conducting independently of said first network, means to be connected to said first control electrode of said first device for rendering said first device conducting independently of said first network, and means connected to said first control electrode of said third device for conditioning said third device to become conducting when said third network is substantially discharged.

10. In combination a first conductor; a second conductor; a third conductor; a fourth conductor; each of said conductors being electrically separate from the others, means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase; a first gaseous electric discharge device having an anode, a cathode, a first control electrode and a second control electrode; a second gaseous electric discharge device having an anode, a cathode and a control electrode; a third gaseous electric discharge device having an anode, a cathode, a first control electrode, and a second control electrode; a fourth gaseous electric discharge device having an anode and a cathode; a fifth gaseous electric discharge device having an anode and a cathode; first inductive reactance means; second inductive reactance means; third inductive reactance means; means including said first inductive reactance means for connecting said anode and cathode of said first device between said third conductor and said second conductor respectively; means for connecting said anode and cathode of said second device between said first conductor and said second conductor respectively; mean for connecting said anode and cathode of said third device between said fourth conductor and said second conductor respectively; a first time-constant network; a second time-constant network; a third time-constant network; a fourth time-constant network; a fifth time-constant network; means for connecting said first network in charging relationship between said control electrode of said second device and said anode of said first device so as to be charged by positive current flow between said anode of said first device and said control electrode of said second device while said first device is non-conducting, said first network blocking conduction of said second device when so charged; means for connecting said second network in charging relationship between said cathode of said first device and said anode of said second device, said second network being charged by flow of positive current through said second network to said anode of said second device; means connecting said second network between said second control electrode and cathode of said first device so that when said second network is charged blocks conduction of said first device; means for connecting said third network in charging relationship between said second control electrode of said third device and said anode of said first device, so that said third network is charged by the flow of positive current from said anode of said first device to said control electrode of said third device while said first device is conducting, said third network preventing conduction of said third device when so charged; means connecting said fourth network in charging relationship between said fourth conductor and said first control electrode of said first device to charge said fourth network by positive current flow between said fourth conductor and said first control electrode of said first device, said fourth network when so changed blocking conduction of said first device independently of said first network; means incluuding said second inductive means for connecting said anode and cathode of said fourth device between said fourth and said second conductors respectively; means for connecting said anode of said fourth device to said fourth network to permit said fourth network to discharge when said fourth device is conducting to render said first device conducting independently of said first network; means including said third inductive means connecting said anode and cathode of said fifth device to said third and second conductors respectively; means connecting said fifth network in charging relationship between said anode of said fifth device and said first control electrode of said third device to charge said fifth network by the flow of positive current between said anode of said fifth device and said first control electrode of said third device when said fifth device is non-conducting, said fifth network when charged blocking conduction of said third device; and means connecting said fourth network to said fifth device to block said fifth device when said fourth network is charged and to permit said fifth device to conduct when said fourth network is discharged.

11. In combination, a first conductor; a second conductor; a third conductor; a fourth conductor; each of said conductors being electrically separate from the others, means connected to said first and second conductors for impressing a first alternating potential between said first and second conductors; means connected to said third and second conductors for impressing a second alternating potential between said third and second conductors; means connected to said fourth and second conductors for impressing a third alternating potential between said fourth and second conductors; said second and third potentials being of substantially opposite phase, a first gaseous electric discharge device having an anode, a cathode, a first control electrode and a second control electrode; a second gaseous electric discharge device having an anode, a cathode and a control electrode; a third gaseous electric discharge device having an anode, a cathode, a first control electrode, and a second control electrode; a fourth gaseous electric discharge device having an anode and a cathode; a fifth gaseous electric discharge device having an anode, a control electrode and a cathode; first inductive reactance means; second inductive reactance means, third inductive reactance means; means including said first inductive reactance means for connecting said anode and cathode of said first device between said third conductor and said second conductor respectively; means for connecting said anode and cathode of said second device between said first conductor and said second conuctor respectively; means for connecting said anode and cathode of said third device between said fourth conductor and said second conductor respectively; a first time-constant network; a second time-constant network; a third time-constant network; a fourth time-constant network; a fifth time-constant network; means for connecting said first network in charging relationship between said control electrode of said second device and said anode of said first device so as to be charged by positive current flow between said anode of said first device and said control electrode of said second device while said first device is non-conducting; said first network blocking conduction of said second device when so charged; means for connecting said second network in charging relationship between said cathode of said first device and said anode of said second device, said second network being charged by flow of positive current through said second network to said anode of said second device; means connecting said second network between said control electrode and cathode of said first device so that when said second network is charged blocks conduction of said first device; means for connecting said third network in charging relationship between said second control electrode of said third device and said anode of said first device, so that said third network is charged by the flow of positive current from said anode of said first device to said control electrode of said third device while said first device is conducting, said third network preventing conduction of said third device when so charged, means connecting said fourth network in charging relationship between said fourth conductor and said first control electrode of said first device to charge said fourth network by positive current flow between said fourth conductor and said first control electrode of said first device, said fourth network when so charged blocking conduction of said first device independently of said first network; means including said second inductive means for connecting said anode and cathode of said fourth device between said fourth and second conductors respectively; means for connecting said anode of said fourth device to said fourth network to permit said fourth network to discharge when said fourth device is conducting to render said first device conducting independently of said first network; means including said third inductive means connecting said anode and cathode of said fifth device to said third and second conductors respectively; means connecting said fifth network in charging relationship between said anode of said fifth device and said first control electrode of said third device to charge said fifth network by the flow of positive current between said anode of said fifth device and said first control electrode of said third device when said fifth device is non-conducting, said fifth network when charged blocking conduction of said third device; and means for connecting said fourth network to said control electrode of said fifth device to block said fifth device when said fourth network is charged and to permit said fifth device to conduct when said fourth network is discharged.

12. In combination a first conductor; a second conductor; a third conductor; a fourth conductor; each of said conductors being electrically separate from the others; means connected to said first and second conductors for impressing a first alternating potential between them; means connected between said third and second conductors for impressing a second alternating potential between them; means connected between said fourth and second conductors for impressing a third alternating potential between them; said second and third potentials being of opposite phase; a first gaseous electric discharge device having an anode, a cathode and a control electrode; a second gaseous electric discharge device having an anode, a cathode and a control electrode; a third gaseous electric disccharge device having an anode, a cathode and a control electrode; a first time-constant network; a second time-constant network; inductive reactance means; means including said inductive reactance means for connecting the anode and the cathode of the first device between said third conductor and said second conductor, respectively; means for connecting the anode and the cathode of the second device between said first conductor and the second conductor, respectively; means for connecting the anode and the cathode of the third device between said fourth conductor and said second conductor, respectively; means for connecting said first network in charging relationship between the cathode of the first device and said anode of the second device to be charged by the flow of positive current from said cathode of said first device to said anode and said second device when said second device is non-conducting, said first network also being connected between the control electrode and cathode of said first device and when charged blocking conduction of said first device; means for connecting said second network in charging relationship between said control electrode of the second device and said anode of the first device to be charged by the flow of positive current through said second network to said control electrode of said second device, said second network when charged blocking conduction of said second device; means connected to said first device for blocking conduction of said first device independently of said first network; means connected to said first device for initiating the conduction of the first device independently of said first network; means responsive to the conduction of the first device connected to the control electrode of the third device for preventing the conduction of the third device during each half period following a half period during which said first device is conducting; means connected to said first device for conditioning said third device to become conducting a predetermined time interval after the conduction of the first device is initiated; and means for connecting the anode of the second device to the anode of the third device whereby said first network is connected in charging relationship to the anode of the third device.

13. In combination, a first conductor; a second conductor; a third conductor; a fourth conductor; each of said conductors being electrically separate from the others; means connected to said first and second conductors for impressing a first alternating potential between them; means connected between said third and second conductors for impressing a second alternating potential between them; means connected between said fourth and second conductors for impressing a third alternating potential between them; said second and third potentials being of opposite phase; a first gaseous electric discharge device having an anode, a cathode and a control electrode; a second gaseous electric discharge device having an anode, a cathode and a control electrode; a third electric gaseous discharge device having an anode, a cathode and a control electrode; a first time-constant network; a second time-constant network; inductive reactance means; means including said inductive reactance means for connecting the anode and the cathode of the first device between said third conductor and said second conductor, respectively; means for connecting the anode and the cathode of the second device between said first conductor and the second conductor, respectively; means for connecting the anode and the cathode of the third device between the fourth conductor and the second conductor, respectively; means for connecting said first network in charging relationship between the cathode of the first device and the anode of the second device to be charged by the flow of positive current from said cathode of said first device to said anode and said second device when said second device is conducting, said first network also being connected between the control electrode and cathode of said first device and when charged blocking conduction of said first device; means for connecting the second network in charging relationship between the control electrode of the second device and said anode of the first device to be charged by the flow of positive current through said second network to said control electrode of said first device, said second network when charged blocking conduction of said second device; means connected to said first device for blocking conduction of said first device independently of said first network; means connected to said first device for initiating the conduction of the first device independently of said first network; means responsive to the conduction of the first device connected to the control electrode of the third device for preventing the conduction of the third device during each half period following a half period during which said first device is conducting; means connected to said first device for conditioning said third device to become conducting a predetermined time interval after the conduction of the first device is initiated, and means including rectifier means for connecting the anode of the second device to the anode of the third device whereby said first network is connected in charging relationship to the anode of the third device, said rectifier means being poled to conduct positive current from said anode of said second device to said anode of said third device.

14. In combination a first conductor, a second conductor, a third conductor, said conductors being electrically separate from each other, a first time-constant network, means including said network connected to said first and second conductors for impressing a first alternating potential between said first and second conductors through said network, means connected to said third and second conductors for impressing a second alternating potential between them, a first gaseous electric discharge device having an anode, a cathode and a control electrode, means including said inductive reactance means connecting said anode and cathode between said third conductor and said second conductor respectively, means connecting said network between said control electrode and said cathode, said network blocking conduction of said device when charged and permitting said device to conduct when discharged, a second gaseous electric discharge device having an anode, a cathode and a control electrode, means connecting said cathode of said second device to said second conductor, means connecting said anode of said second device to said first conductor, whereby said first network may be charged by the flow of positive current from said network to said anode of said second device, said network when so charged blocking conduction of said first device, a second network, means connecting said second network in charging relationship between the anode of the first device and said control electrode of said second device so that said second network is charged by the positive current conducted from said anode of said first device to said control electrode of said second device when said first device is non-conducting and is permitted to discharge when said first device is conducting, said second network blocking conduction of said second device when charged and permitting said second device to conduct when discharged, means independent of said first network connected to said first device to maintain said first device non-conducting, and means connected to said independent means and to said first device for initiating conduction of said first device and for thereafter conditioning said first device to conduct when said first network is discharged.

References Cited in the file of this patent

UNITED STATES PATENTS

| | | |
|---|---|---|
| 2,424,999 | Ostlund et al. | Aug. 5, 1947 |
| 2,574,373 | Bivens | Nov. 6, 1951 |
| 2,611,085 | Masson | Sept. 16, 1952 |
| 2,612,579 | Bivens | Sept. 30, 1952 |
| 2,614,240 | Bivens | Oct. 14, 1952 |

OTHER REFERENCES

Terman's Radio Engineer's Handbook (1943), 1st ed., p. 614.